L. BLOCH.
VEHICLE WHEEL.
APPLICATION FILED AUG. 31, 1907.
951,173.
Patented Mar. 8, 1910.
2 SHEETS—SHEET 1.
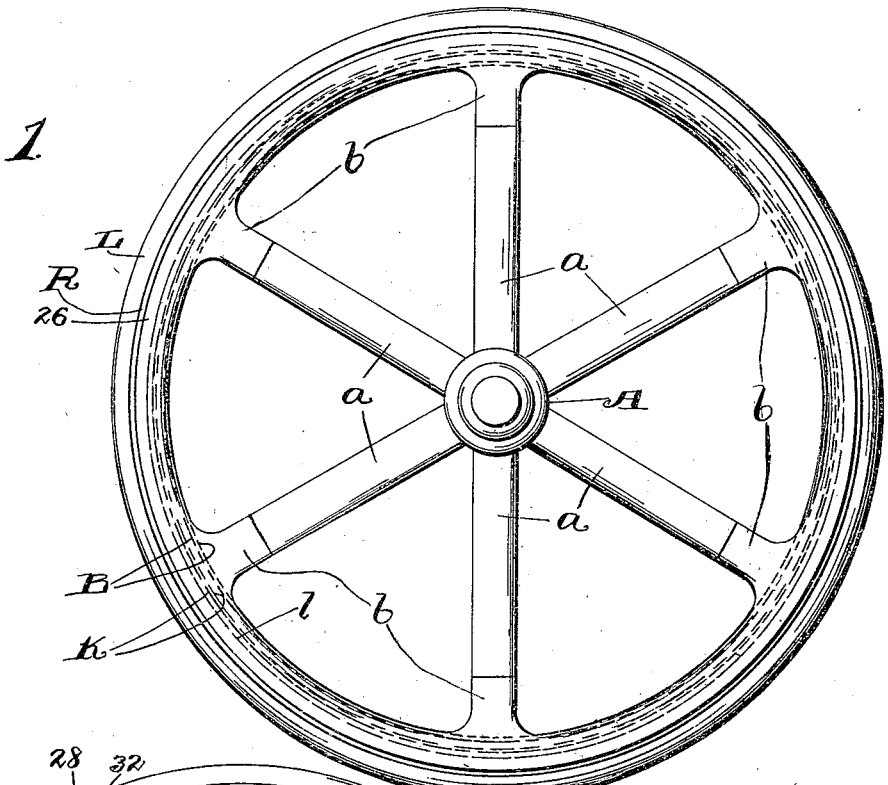
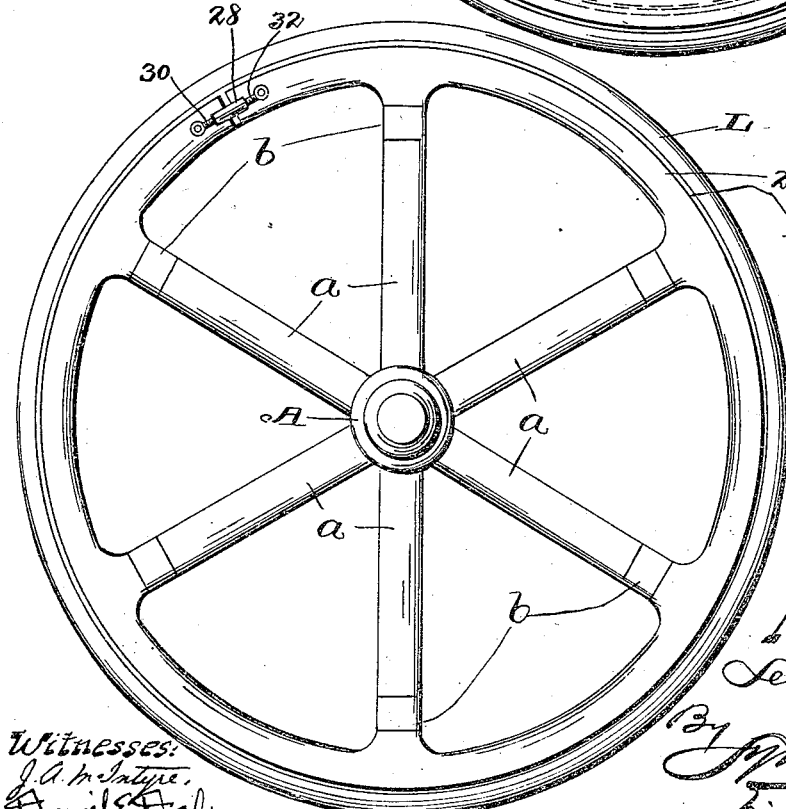

L. BLOCH.
VEHICLE WHEEL.
APPLICATION FILED AUG. 31, 1907.
951,173.
Patented Mar. 8, 1910.
2 SHEETS—SHEET 2.
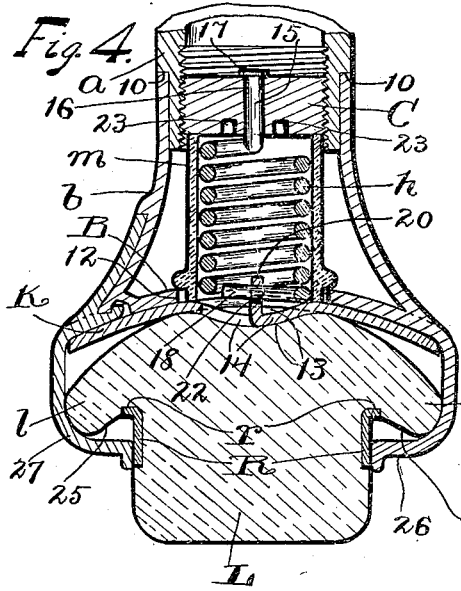
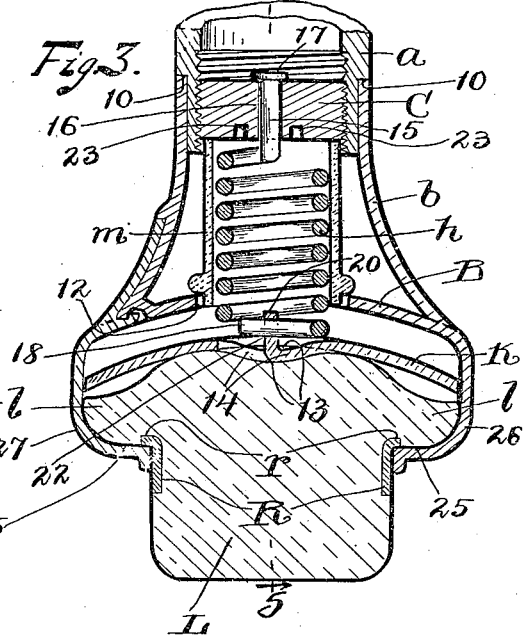
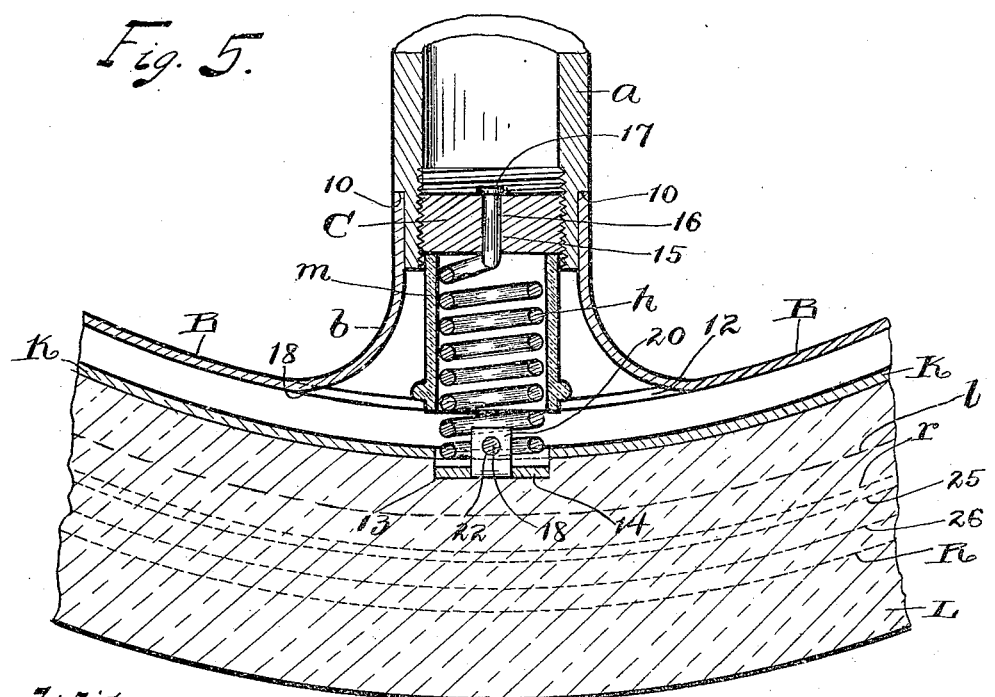
Witnesses:
J. A. McIntyre
Daniel E. Daly
Inventor
Léon Bloch
By
his Attorneys.

UNITED STATES PATENT OFFICE.

LEON BLOCH, OF CLEVELAND, OHIO.

VEHICLE-WHEEL.

951,173.  Specification of Letters Patent.  Patented Mar. 8, 1910.

Application filed August 31, 1907. Serial No. 390,875.

*To all whom it may concern:*

Be it known that I, LEON BLOCH, a citizen of the United States of America, residing at Cleveland, in the county of Cuyahoga and State of Ohio, have invented certain new and useful Improvements in Vehicle-Wheels; and I hereby declare the following to be a full, clear, and exact description of the invention, such as will enable others skilled in the art to which it pertains to make and use the same.

This invention relates to improvements in vehicle-wheels.

The primary object of this invention is to construct a vehicle-wheel having a tire so supported from and connected with the rim of the wheel that vibration of a vehicle having wheels embodying the said invention is, when running over rough or uneven roads, reduced to a minimum.

Another object is to cushion the tire by spiral springs arranged radially of the wheel at the outer ends of the spokes and attached to the tire and to the spokes, which springs act to retain the tire concentrically relative to the axis of the wheel and coöperate in preventing creeping of the tire circumferentially of the wheel.

With these objects in view, and to the end of realizing other advantages hereinafter appearing, this invention consists in certain features of construction, and combinations of parts, hereinafter described, pointed out in the claims, and illustrated in the accompanying drawings.

In the said drawings, Figures 1 and 2 are opposite side views respectively of a vehicle-wheel embodying my invention. Fig. 3 is a section taken through the tire and wheel-rim at the outer end of one of the spokes, and also showing the said end of the said spoke. Fig. 4 is a section corresponding with Fig. 3, except that in Fig. 4 the tire is shown pressed inwardly, compressing the spring illustrated in Figs. 3 and 4. Fig. 5 is a section on line 5—5, Fig. 3, looking in the direction indicated by the arrow.

Referring to the said drawings, A indicates the hub of my improved wheel; *a*, the spokes, and B, the rim. The spokes are arranged radially of the wheel and spaced equi-distantly circumferentially of the hub in the usual manner. The spokes are suitably attached at their inner ends to the hub. Each spoke preferably consists of a steel tube screw-threaded internally at its outer end, and a correspondingly externally screw-threaded bushing C is screwed into the said end of the spoke. Each spoke is reduced transversely near its outer end to form a shoulder 10 which extends around the spoke a short distance from and faces toward the outer end of the spoke, and a collar *b* is mounted on the said end of the spoke and abuts against the said shoulder and is tightly forced into, brazed or otherwise rigidly secured to the spoke.

The rim B is preferably metallic and extends circumferentially of the wheel opposite the outer ends of the spokes. The rim B is brazed to or otherwise rendered rigid with the collars *b* which form inwardly projecting members of the rim.

At the outer end of each spoke *a* is a spiral spring *h* which is arranged radially of the wheel in line endwise with the spoke and suitably attached at the inner end to the bushing C of the said spoke. It will be observed therefore that the springs are attached at their inner ends to the spokes.

The springs *h* are attached at their outer ends to a substantially nonflexible steel ring K which surrounds the rim B and is enough larger diametrically than the rim to accommodate the extension of the springs from the spoke endwise through and a suitable distance outwardly beyond the periphery of the rim which is slotted, as at 12, to accommodate the location and operation of the springs.

A solid tire L of compressible and elastic material, such, for instance, as rubber, is mounted on and surrounds the ring K which forms a seat for the tire. The tire L is provided internally with recesses 13 spaced circumferentially of the tire and engaged by outwardly bulged portions or projecting lugs 14 formed on the ring K. In other words, the ring K is provided with projecting members 14 spaced circumferentially of the ring and extending into recesses or holes 13 formed in the tire. The ring K and the tire L are therefore so connected together that creeping or circumferential displacement of the said parts independently of each other is prevented, and consequently the tire is attached to the springs *h* so far as concerns circumferential creeping of the tire independently of action upon the springs. Preferably the mutually engaging recesses or holes 13 and members 14 are arranged opposite the outer ends of the springs *h*.

Preferably the inner end of each spring $h$ terminates in an inwardly projecting member 15 which is arranged radially of the wheel and extends loosely through a hole 16 which is formed in and extends through the bushing C to which the said spring is attached, and the said member 15 terminates in a head 17 overlapping the inner end of the bushing and preventing detachment of the spring from the bushing. The said member 15 of each spring $h$ is, moreover, loose enough within the connected bushing C to freely accommodate turning of the bushing without turning the spring. Each spring $h$ is obviously therefore swiveled to and centrally attached to the bushing.

Each spring $h$ terminates at its outer end in a member 18 which is arranged horizontally and transversely of the ring K and engages a hole 22 formed in a member 20 which projects inwardly from the adjacent outwardly bulged portion 14 of the said ring and is arranged radially of the wheel.

The outer end of the bushing C is provided with two recesses 23 arranged at opposite sides respectively of the hole 16 for the reception of the forked end of a forked screwdriver (not shown) which, preparatory to the application of the ring K and tire L or upon the removal of the tire and ring, can be passed through the coils of the springs $h$ from the outer ends of the springs, and obviously the tension of the springs is properly regulated by turning the bushings in the direction and to the extent required. It will be observed therefore that the bushings C form abutments for the inner ends of the springs, which abutments are adjustable radially of the wheel to accommodate regulation of the tension of the springs.

The tire L is provided a suitable distance from its tread-forming periphery with two laterally and outwardly projecting flanges $l$ and $l$ which are arranged at opposite sides respectively of the inner portion and extend circumferentially of the tire and surround the ring K and consequently form shoulders 25 which extend circumferentially of the tire and face in the direction of the said periphery. The shoulder formed by one of the tire-flanges is snugly overlapped by a flange 26 formed on and extending circumferentially of the rim B at one side of the tire, and the shoulder formed by the other tire-flange is overlapped by a metal strap 27 which extends circumferentially of the said rim and is removably attached in any approved manner to the rim at the other side of the tire and tightly held to the rim and connected spoke-embracing collars $b$ by a proper manipulation of a turn-buckle 28 which, as shown in Fig. 2, is employed in drawing together two rods 30 and 32 attached to opposite ends respectively of the said strap, which rods are suitably screw-threaded and connected together by the said turn-buckle in the usual manner of applying turn-buckles.

The rim-members 26 and 27 effectually prevent displacement of the tire from the ring K, and the springs $h$ are normally somewhat compressed by the ring K during the normal arrangement of the tire concentrically relative to the hub of the wheel.

To reduce the friction between the members 26 and 27 and the tire to a minimum during any pressure against the tread-forming periphery of the tire two bars R are embedded in opposite sides respectively and extend circumferentially of the tread-forming portion of the tire adjacent the shoulders 25 and arranged with their outer sides flush with the said sides of the said portion of the tire, and the members 26 and 27 extend into close proximity to the said bars and form guides for the tire during pressure against the periphery of the tire opposite the outer ends of any one or more of the spokes. The bars R are provided at the shoulder 25 of the tire with laterally and outwardly projecting flanges $r$ which are overlapped by the members 26 and 27 of the wheel-rim, and the relative arrangement of the parts is such that the said tire-flanges $l$ are under tension in the normal position of the tire so as to cause the shoulders 25 to be tightly engaged by the rim-members 26 and 27 and thereby form a fluid-tight joint between the said shoulders and the said members 26 and 27. When, however, the tire is pressed inwardly by pressure exerted by the surface of the roadway against the tread or periphery of the tire opposite the outer end of any spoke the flanges $l$ of the tire assume the shape shown in Fig. 4, and the ring K is lifted and thereby compresses the spring attached to the said spoke as shown in the said figure.

To prevent rattling of the springs $h$, each spring $h$ is embraced by a tube $m$ composed of elastic and compressible material, such, for instance, as rubber, and interposed between the outer end of the bushing C attached to the said spring and the wheel-rim B.

By the construction hereinbefore described it will be observed that any pressure against the tread or periphery of the tire opposite the outer end of any spoke not only compresses the spring between the said tire and the said spoke, but acts upon all of the remaining springs of the wheel, and more especially is the action upon all the springs important when any spring is pulled upon at its outer end by any tendency of the tire to creep circumferentially of the wheel. In other words, by the attachment of all the springs at their inner ends to the spokes and at their outer ends to the ring K and consequently to the tire so far as concerns circumferential displacement of the tire independently of the last-mentioned ends of the springs all the springs coöperate in yieldingly preventing such displacement or creeping of the tire circumferentially of the wheel.

What I claim is:—

1. A vehicle-wheel comprising a hub; radially arranged spokes spaced circumferentially of the hub and attached at their inner ends to the hub; which spokes are tubular and screw-threaded internally at their outer ends; a rim extending circumferentially of the wheel at the outer ends of and attached to the spokes; externally screw-threaded bushings screwed into the outer ends of the spokes; spiral springs arranged radially of the wheel at the outer ends of and swiveled to the bushing; a ring surrounding the rim at the outer ends of the springs, and a compressible and elastic tire surrounding the ring.

2. A vehicle-wheel comprising a hub; radially arranged spokes spaced circumferentially of the hub and attached at their inner ends to the hub; a rim extending circumferentially of the wheel at the outer ends of and attached to the spokes; spiral springs arranged radially of the wheel at the outer ends of the spokes and extending through the rim, and a tire surrounding the rim and connected to the springs, the rim being slotted circumferentially to accommodate the location and operation of the springs.

3. A vehicle-wheel comprising a hub; radially arranged spokes spaced circumferentially of the hub and attached at their inner ends to the hub; a rim extending circumferentially of the wheel at the outer ends of and attached to the spokes; spiral springs arranged radially of the wheel at the outer ends of and attached to the spokes and extending through the rim, and a tire surrounding the rim and attached to the springs, the rim being slotted circumferentially to accommodate the location and operation of the springs.

In testimony whereof, I sign the foregoing specification, in the presence of two witnesses.

LEON BLOCH.

Witnesses:
C. H. DORER,
VICTOR C. LYNCH.